UNITED STATES PATENT OFFICE.

WIRT TASSIN, OF WASHINGTON, DISTRICT OF COLUMBIA.

NEGATIVE ELECTRODE AND PROCESS OF MAKING THE SAME.

1,129,818.      Specification of Letters Patent.      Patented Feb. 23, 1915.

No Drawing.      Application filed June 6, 1914. Serial No. 843,495.

*To all whom it may concern:*

Be it known that I, WIRT TASSIN, a citizen of the United States, residing at Washington, in the District of Columbia, have invented certain new and useful Improvements in Negative Electrodes and Processes of Making the Same, of which the following is a specification.

This invention relates to negative electrodes and processes of making the same; and it comprises a process of making highly efficient and durable negative electrodes for primary cells of a type analogous to the Lalande type, wherein an intimate mixture of cuprous and cupric oxids in the approximate ratio of 2:1 is prepared, advantageously by calcining copper sulfate at about 1500 F. to remove sulfuric acid, and then bringing the calcined iron-free material to a temperature at which oxygen is liberated and the material is at a fusion temperature, or around 1925 F., and forming the intimate mixture of cuprous and cupric oxids thus produced into an electrode of a desired shape; and it further comprises as a new article of manufacture an oxid electrode composed of cuprous and cupric oxids in a state of intimate mixture, this intimate admixture existing in the particles or grains of which the electrode is composed and the admixture being advantageously so intimate as to give the material practically the characters of a chemical compound, and in the approximate ratio of 2:1, the particles of the electrode advantageously having the characteristics of fused or sintered material; all as more fully hereinafter described and as claimed.

In the common type of the Lalande cell, the electrodes are respectively composed of black copper oxid or cupric oxid, and zinc, the electrolyte being, usually, alkaline in its nature. The electrolyte may or may not be thickened with various materials to give the so-called "dry" cell. In this cell the electrical energy is yielded by the oxidation of the zinc at the expense of the copper oxid. As a matter of theory, from thermo-chemical considerations, the maximum energy would be yielded by a couple in which zinc is opposed to CuO. Therefore in the art, this electrode is composed of black oxid of copper or cupric oxid. The cupric oxid is derived from copper scale or a specially made black oxid. It is usually mixed with a binder of some sort and heated to a temperature sufficient to convert it, with the aid of the binder, into a coherent but porous mass. The binder may be a silicate material, such as glass, enamel or the like, various alkalis, carbonaceous materials, etc. Very frequently no attempt is made to form the black oxid into a coherent mass at all, it being simply held in the cell in the granulated state by bags, porous containers, etc. Contrary to the general impression as regards this type of primary cell I have found that a longer life under load conditions with a greater recuperative power and other advantages are obtained by using an electrode composed of a homogeneous mixture or compound of the red or cuprous oxid with a less quantity of the black oxid. The proportion of cuprous oxid to cupric oxid may be, and very advantageously is, as high as 2:1 although other ratios may be used. In an intimate and homogeneous mixture of the two oxids any proportion of cuprous oxid is advantageous but by far the best results are given by a high proportion, such as the 2:1 ratio. The ratio in an otherwise desirable electrode material may be easily secured by a method hereinafter set forth. The electrode material is best substantially free of iron. Cells provided with electrodes of this type give a very satisfactory discharge rate, and the full discharge rate is reached immediately on placing into action, something which is not true of the usual black oxid electrode. The recuperative power is greater than that of the ordinary black oxid electrode.

While a negative electrode of the ordinary black copper oxid type after exhaustion may in part be restored by a reversal of the electric current through the cell, such restoration is usually incomplete, lacks positiveness, is indefinite and unsatisfactory. In an electrode of my type on the other hand a reversal of the current efficiently restores the exhausted electrode and rapidly gives definite and positive results which are superior to those obtained from such ordinary copper-oxid electrodes so treated.

While my cupro-cupric electrode may be made of very finely powdered oxids obtained in other ways and intimately admixed in the correct proportion, I find that I can directly prepare the electrode material from copper salts, even the crude commercial salts, in very simple ways. For example in so doing I can take copper sulfate (cupric sulfate) which may be of a low grade commercially, and heat it in any usual type of furnace to about 1500 F. This heating calcines the salt, removing the sulfuric acid and converts any iron sulfate which may be present into iron oxid, which, under these conditions is of the magnetic type. The operation gives me a material containing all the iron in a condition in which it can be magnetically removed. The next step is to take the oxid so prepared and fine grind it, advantageously to about 100 mesh, and treat with a magnet. In the case of pure copper sulfate this step of removing iron is not necessary and fine grinding, etc., after calcining may be omitted, the heating being continued and increased to perform the next or deoxidizing step without cooling down. The fine ground treated material is next brought to a temperature at which the copper oxid is partially deoxidized; to a heat at which it evolves oxygen freely. This temperature is about 1900° F. I find that a temperature as near 1925 F. as possible is the best adapted for my purposes. Temperatures much above 1925° give a less desirable product. At 1900–1925 there is a great evolution of oxygen and the material finally becomes converted into the two oxids, the product being a homogeneous material in which they exist as a compound or composition in which mechanical separation is imposible. If not in a state of combination they are at all events so intimately mingled that the state of mixture is almost, if not quite, molecular. An equilibrium is established with a molecular ratio of $Cu_2O:CuO=2:1$. At the stated temperature both oxids are fusible and a fused or sintered product results; the degree of fusion or sintering depending upon the time of exposure to the heat. Cuprous and cupric oxids otherwise produced may be fine ground, mixed and brought to this temperature with quite similar results. But, I find it much better to produce the two oxids by heating black oxid till evolution of oxygen and equilibrium result since the mixture of the two oxids is then better than can be attained mechanically. However the material of the electrode of the present invention is prepared, to secure the results desired in this invention the two oxids of copper must be so intimately admixed as to give a substantially homogeneous composition, not only considering the electrode as a whole but also the several grains or particles of which it may be composed; there must be visible no particles, lines or bodies of either oxid existing alone.

While the fused or sintered material may be simply granulated and used in porous bags or containers, I find it better to use it in molded form. In so doing I may simply take the calcined material first produced and place it in a container or mold of the desired shape and fuse or sinter it at a temperature of 1925° or thereabout. In so doing deoxidation and molding are one operation. Or I may take the sintered or fused material, fine grind and then shape. For this purpose I mix the fine ground material, which is advantageously ground to 100 mesh or finer, with a binder which may be a carbonaceous material such as molasses, glucose, etc. and mold by any suitable apparatus into the desired shape. The molded article may then be baked to set the binder. With carbonaceous materials the baking temperature may be around 350° F.; with silicate binders such as glass, waterglass, etc., or alkaline binders, such as soda, the baking temperature is varied to suit conditions. I regard the carbonaceous binders as being the more advantageous kind since the others will in a degree act as a diluent for the oxids; as a varnish or coating for the several granules and they, to that extent, hinder the activity of the cell.

Prior to molding it is advantageous to insert a metal wire, preferably of copper, into the mass to provide for the necessary terminal. The electrode so produced may be used either in a primary or a secondary cell; but I regard it as particularly advantageous for primary cells.

What I claim is:—

1. As a new article of manufacture, an electrode composed of an intimate and uniform mixture of cuprous and cupric oxids.

2. As a new article of manufacture, an electrode composed of an intimate and uniform mixture of cuprous and cupric oxids, the intimacy of admixture being such as to make it substantially molecular.

3. An electrode composed of an intimate mixture of cuprous and cupric oxids in the approximate molecular ratio of 2:1.

4. An electrode composed of an intimate mechanically inseparable mixture of cuprous and cupric oxids in about the molecular ratio 2:1, the particles composing such electrode having the characteristics of fused material.

5. The process of manufacturing electrodes which comprises maintaining a copper oxid at about the fusing point till an equilibrium between cuprous and cupric oxids is established and then molding into a desired form.

6. In the manufacture of electrodes, the process which comprises calcining a copper salt to remove acid constituents, heating the calcined material until fusion sets in and a portion of the oxygen is evolved with formation of cuprous oxid, and molding into shape.

7. The process of making electrodes from impure copper sulfate containing iron which comprises calcining such copper sulfate to remove sulfuric acid and form magnetic oxid of iron, separating the magnetic oxid of iron, heating the purified material until fusion sets in and a portion of the oxygen is evolved, and molding into shape.

8. The process of making electrodes which comprises calcining a copper salt and bringing the calcined material to a fusing temperature, heating at such temperature being maintained until a portion of the oxygen is evolved and an equilibrium between cuprous and cupric oxids is established in the approximate ratio 2:1.

In testimony whereof, I affix my signature in the presence of two subscribing witnesses.

WIRT TASSIN.

Witnesses:
K. P. McElroy,
J. H. Siggers.